Aug. 31, 1965  D. W. BOND  3,203,507
SPREADING TYPE DISC BRAKES
Filed Jan. 9, 1964  2 Sheets-Sheet 1
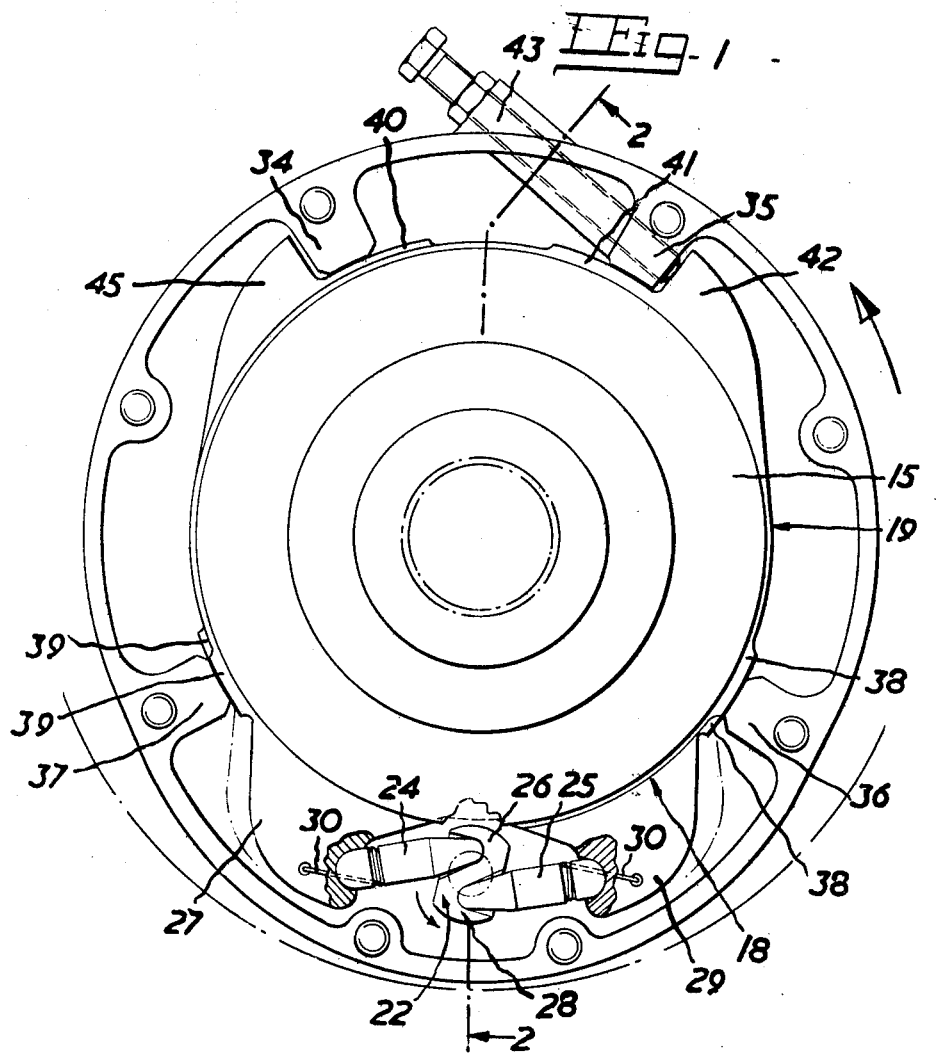
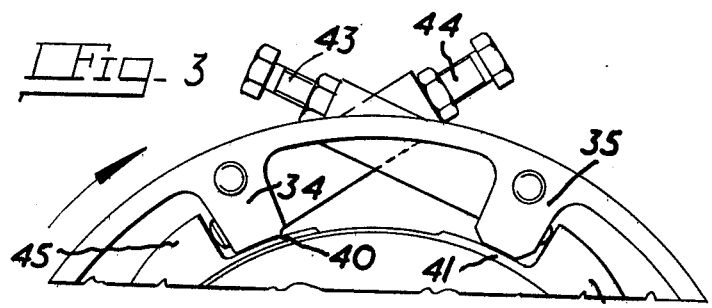
David William Bond
BY Scrivener, Parker Scrivener & Clarke

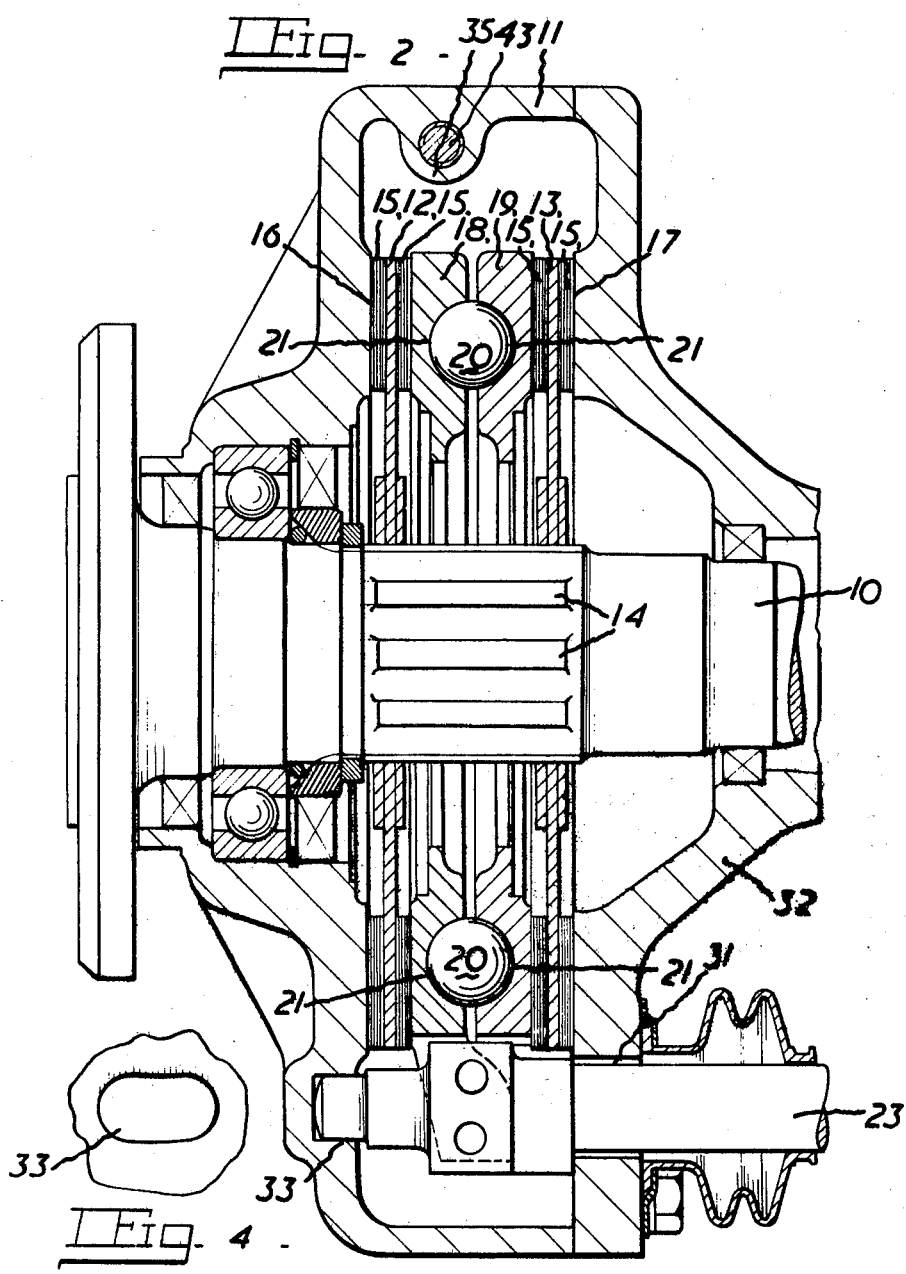

United States Patent Office 3,203,507
Patented Aug. 31, 1965

3,203,507
SPREADING TYPE DISC BRAKES
David William Bond, Honeybourne, England, assignor to Girling Limited, Birmingham, England, a British company
Filed Jan. 9, 1964, Ser. No. 336,660
Claims priority, application Great Britain, Jan. 11, 1963, 1,309/63
8 Claims. (Cl. 188—72)

This invention relates to improvements in disc brakes of the kind in which rotatable discs keyed to but axially movable on a shaft are gripped between axially separable pressure plates and radial surfaces in a stationary housing. Balls or rollers are located in co-operating inclined or conical recesses in the adjacent faces of the pressure plates to urge them apart on relative angular movement between the plates. The application of the brake is initiated by moving the pressure plates angularly in opposite directions until they engage the discs. The plates then tend to be carried round with the discs until an abutment on one or other of the plates, according to the direction of rotation of the discs, engages a stop abutment on the housing, and the continued angular movement of the other plate with the discs causes the plates to be urged apart by the balls or rollers to apply the brake.

The pressure plates are usually located and supported by three angularly spaced guides or pilots which project radially inwards from the housing and with which machined portions of the peripheries of the plates co-operate, the guides being spaced apart at angles of 120°.

The pressure plates are usually moved angularly in opposite directions by toggle links coupled to lugs on the plates and actuated by a radial rod or cable.

According to our invention, in a disc brake of that kind the relative angular movement of the pressure plates to initiate the application of the brake is effected by a cam in conjunction with means for adjusting the angular position of the abutment which arrests the angular movement of one of the plates.

Normally, when wear of the friction pads or rings carried by the disc has occurred there is an appreciable angular movement of the plates before the rear plate is arrested, and the plate is liable to engage its abutment with a considerable impact. By making the abutment adjustable this is avoided.

One practical form of brake in accordance with our invention is illustrated by way of example in the accompanying drawings in which:

FIGURE 1 is a side elevation of the brake viewed from the outboard side with its cover plate removed;

FIGURE 2 is a section on the line 2—2 of FIGURE 1;

FIGURE 3 is a view similar to the upper portion of FIGURE 1 but showing a modification; and FIGURE 4 is a view of a slot for retaining the end of a cam shaft shown in FIGURE 2.

In the brake illustrated in FIGURES 1 and 2, 10 is a shaft such as a half-shaft in a vehicle transmission and is rotatably mounted in a stationary housing 11 which may be part of an axle casing.

Two axially spaced discs 12 and 13 are slidably keyed on the shaft by means of splines 14 and rotate with the shaft. Rings of friction material 15 are bonded or otherwise secured to opposite faces of each disc. The rings co-operate with flat radial surfaces 16 and 17 on the end walls of the housing 11 and with similar radial surfaces on pressure plates comprising rings 18 and 19 located between the discs. Balls 20 are located between the rings and co-operate with conical or inclined recesses 21 in the adjacent faces of the rings whereby on relative angular movement between the rings they are urged apart to grip the discs between themselves and the end walls of the housing.

Relative angular movement of the rings in opposite directions to initiate application of the brake is effected by a cam 22 mounted on a cam shaft 23 rotatably mounted in the housing.

The cam actuates the rings through thrust members or dollies 24 and 25 of which thrust member 24 is interposed between a lobe 26 on the cam and a radially projecting ear 27 on the ring 19 and thrust member 25 is interposed between a lobe 28 on the cam and a radially projecting ear 29 on the ring 18. The thrust members or dollies are conveniently formed with part-spherical ends received in complementary recesses in the lobes of the cam and in the ears and their outer ends are coupled to the ears by spring clips 30 or the like.

The cam shaft 23 on which the cam 22 is mounted passes through a slot 31 in a cover plate 32 detachably secured to the housing 11 and the shaft at its inner end is retained in a corresponding slot 33 in end wall of the housing opposite the cover plate, the form of the slot 33 being shown in FIGURE 4. The shaft is thus permitted a limited floating movement in a circumferential direction when the brake is applied.

The axis of the cam shaft is parallel to that of the shaft 10 so that there is a saving in radial space compared with the usual toggle actuator.

The rings 18 and 19 are maintained concentric with respect to the axis of the brake by radial lugs on the peripheries of the rings which co-operate with guides or pilots in the housing. As shown in FIGURE 1, four angularly spaced guides or pilots 34, 35, 36 and 37 project radially inwards from the housing and radial lugs 38 and 39 on each ring co-operate with the guides 36 and 37. The guides 34 and 35 are equally spaced on opposite sides of a point in the housing normally diametrically opposite to the cam shaft 23 and a radial lug 40 on the ring 18 co-operates with the guide 34 and a radial lug 41 on the ring 19 co-operates with the guide 35.

The radial lug 41 on ring 19 is extended circumferentially in a clockwise direction and extended radially outwards to form an ear 42 which cooperates with an adjustable abutment stop on the guide 35 to arrest angular movement of the ring 19 in the application of the brake when the discs are rotating in the direction indicated. The adjustable stop is formed by a bolt 43 screwed through the radial guide 35 and the axis of the bolt is substantially at right angles to a radius of the brake passing through the guide and its outer end is accessible outside the housing for adjusting it. The inner end of the bolt projects through the guide and co-operates with the ear 42.

As shown in FIGURE 3, the guide 34 for ring 18 may also have a bolt 44 screwed through it which is inclined to the bolt 43 and provides an adjustable abutment with which an ear 45 on the ring 18 co-operates to arrest angular movement of that ring in the application of the brake when the discs are rotating in the direction indicated in FIGURE 3.

When the shaft 10 and discs 12 and 13 are rotating in the direction indicated in FIGURE 1, and the rings 18 and 19 are brought into engagement with the discs by the operation of the cam 22, they tend to rotate with the disc until movement of the ring 19 is arrested by the engagement of the ear 42 on the ring with the end of the bolt 43 projecting from the guide 35 and the other ring 18 produces a self-energising or servo-action through the engagement of the balls with the co-operating recesses in the ring. When the shaft is rotating in the opposite direction as shown in FIGURE 3, movement of the ring 18 is arrested by the engagement of the ear 45 with the end of the bolt 44 projecting from the guide 34 and the other ring 19 produces a self-energising or servo action.

I claim:

1. A disc brake comprising a stationary housing, a rotatable shaft within said housing, a pair of axially spaced discs slidably mounted on said shaft, annular braking surfaces on opposite sides of each disc, braking means for engagement with said annular braking surfaces, axially spaced radial surfaces in said housing, axially separable pressure plates located between the discs for bringing the discs into frictional engagement with the radial surfaces in the housing, co-operating inclined recesses in adjacent faces of said pressure plates, balls or rollers located in the recesses for urging apart the pressure plates on relative angular movement between the pressure plates, angularly spaced pilot lugs projecting radially inwards from the housing and adapted to co-operate with portions of the outer peripheries of the plates to locate them centrally with respect to the housing, a cam for effecting relative angular movement between said plates when the brake is applied, an abutment stop for arresting angular movement of at least one of said plates defined at least in part by one of said angularly spaced pilot lugs, and a bolt passing through an opening in the housing and screwed through said one pilot lug for adjusting the angular position of said abutment stop, said bolt at its outer end projecting from the housing and externally accessible for adjustment, and at its inner end engageable with a radial lug on said one pressure plate for arresting angular movement of said pressure plates.

2. A disc brake comprising a stationary housing, a rotatable shaft within said housing, a pair of axially spaced discs slidably mounted on said shaft, annular braking surfaces on opposite sides of each disc, braking means for engagement with said annular braking surfaces, axially spaced radial surfaces in said housing, axially separable pressure plates loctead between the disc for bringing the discs into frictional engagement with the radial surfaces in the housing, co-operating inclined recesses in adjacent faces of said pressure plates, balls or rollers located in the recesses for urging apart the pressure plates on relative angular movement between the pressure plates, angularly spaced pilot lugs projecting radially inwards from the housing and adapted to co-operate with portions of the outer peripheries of the plates to locate them centrally with respect to the housing, a cam for effecting relative angular movement between said plates when the brake is applied, abutment stops for arresting angular movement of either of said plates according to the direction of rotation of the discs of which one abutment stop is defined at least in part by one of said pilot lugs and the other abutment stop is defined at least in part by another of said pilot lugs, and a pair of bolts passing through openings in the housing, one bolt being screwed through said one pilot lug for adjusting the angular position of said one abutment stop, and the other bolt being screwed through said another of said pilot lugs for adjusting the angular position of said other abutment stop, each bolt at its outer end projecting from the housing and externally accessible for adjustment, and at its inner end engageable with a radial lug on one of said pressure plates for arresting angular movement of that plate.

3. A disc brake comprising a stationary housing, a rotatable shaft within said housing, a pair of axially spaced discs slidably mounted on said shaft, annular braking surfaces on opposite sides of each disc, braking means for engagement with said annular braking surfaces, axially spaced radial surfaces in said housing, axially separable pressure plates located between the discs for bringing the discs into frictional engagement with the radial surfaces in the housing, co-operating inclined recesses in adjacent faces of said pressure plates, balls or rollers located in the recesses for urging apart the pressure plates on relative angular movement between the pressure plates, angularly spaced pilot lugs projecting radially inwards from the housing and adapted to co-operate with portions of the outer peripheries of the plates to locate them centrally with respect to the housing, a cam for effecting relative angular movement between said plates, a cam shaft on which the cam is mounted and of which the axis is parallel to that of the brake, means permitting a limited floating movement of the cam shaft in a circumferential direction when the brake is applied, an abutment stop for arresting angular movement of at least one of said plates defined at least in part by one of said angularly spaced pilot lugs, and a bolt passing through an opening in the housing and screwed through said one pilot lug for adjusting the angular position of said abutment stop, said bolt at its outer end projecting from the housing and externally accessible for adjustment, and at its inner end engageable with a radial lug on said one pressure plate for arresting angular movement of said pressure plate.

4. A disc brake comprising a stationary housing, a rotatable shaft within said housing, a pair of axially spaced discs slidably mounted on said shaft, annular braking surfaces on opposite sides of each disc, braking means for engagement with said annular braking surfaces, axially spaced radial surfaces in said housing, axially separable pressure plates located between the disc for bringing the discs into frictional engagement with the radial surfaces in the housing, co-operating inclind recesses in adjacent faces of said pressure plates, balls or rollers located in the recesses for urging apart the pressure plates on relative angular movement between the pressure plates, angularly spaced pilot lugs projecting radially inwards from the housing and adapted to co-operate with portions of the outer peripheries of the plates to locate them centrally with respect to the housing, a cam for effecting relative angular movement between said plates, a cam shaft on which the cam is mounted and of which the axis is parallel to that of the brake, means permitting a limited floating movement of the cam shaft in a circumferential direction when the brake is applied, abutment stops for arresting angular movement of either of said plates according to the direction of rotation of the discs of which one abutment stop is defined at least in part by one of the said pilot lugs and the other abutment stop is defined at least in part by another of said pilot lugs, and a pair of bolts passing through openings in the housing, one bolt being screwed through said one pilot lug for adjusting the angular position of said one abutment stop, and the other bolt being screwed through said another of said pilot lugs for adjusting the angular position of said other abutment stop, each bolt at its outer end projecting from the housing and externally accessible for adjustment, and at its inner end engageable with a radial lug on one of said pressure plates for arresting angular movement of that plate.

5. A disc brake comprising a stationary housing, a rotatable shaft within said housing, a pair of axially spaced discs slidably mounted on said shaft, annular braking surfaces on opposite sides of each disc, braking means for engagement with said annular braking surfaces, axially spaced radial surfaces in said housing, axially separable pressure plates located between the discs for bringing the discs into frictional engagement with the radial surfaces in the housing, co-operating inclined recesses in adjacent faces of said pressure plates, balls or rollers located in the recesses for urging apart the pressure plates on relative angular movement between the pressure plates, radially projecting ears on the pressure plates, angularly spaced pilot lugs projecting radially inwards from the housing and adapted to co-operate with portions of the outer peripheries of the plates to locate them centrally with respect to the housing, a cam of S form for effecting relative angular movement between said plates when the brake is applied, lobes on said cam, thrust members for actuating the pressure plates in articulated engagement at their ends with the lobes on the cam and with the radially projecting ears on the pressure plates, an abutment stop for arresting angular movement of at least one of said plates defined at least in part by one of said angularly spaced pilot lugs, and a bolt passing through an opening in the housing and screwed through said one pilot lug for adjusting the angular position of said abutment stop, said bolt at its outer end projecting from the housing and externally accessible for adjustment, and at its inner end engageable with a radial lug on said one pressure plate for arresting angular movement of said pressure plate.

6. A disc brake comprising a stationary housing, a rotatable shaft within said housing, a pair of axially spaced discs slidably mounted on said shaft, annular braking surfaces on opposite sides of each disc, braking means for engagement with said annular braking surfaces, axially spaced radial surfaces in said housing, axially separable pressure plates located between the disc for bringing the discs into frictional engagement with the radial surfaces in the housing, co-operating inclined recesses in adjacent faces of said pressure plates, balls or rollers located in the recesses for urging apart the pressure plates on relative angular movement between the pressure plates, radially projecting ears on the pressure plates, angularly spaced pilot lugs projecting radially inwards from the housing and adapted to co-operate with portions of the outer peripheries of the plates to locate them centrally with respect to the housing, a cam of S form for effecting relative angular movement between said plates when the brake is applied, lobes on said cam, thrust members for actuating the pressure plates in articulated engagement at their ends with the lobes on the cam and with the radially projecting ears on the pressure plates, abutment stops for arresting angular movement of either of said plates according to the direction of rotation of the discs of which one abutment stop is defined at least in part by one of said pilot lugs and the other abutment stop is defined at least in part by another of said pilot lugs, and a pair of bolts passing through openings in the housing, one bolt being screwed through said one pilot lug for adjusting the angular position of said one abutment stop, and the other bolt being screwed through said another of said pilot lugs for adjusting the angular position of said other abutment stop, each bolt at its outer end projecting from the housing and externally accessible for adjustment, and at its inner end engageable with a radial lug on one of said pressure plates for arresting angular movement of that plate.

7. A disc brake comprising a stationary housing, a rotatable shaft within said housing, a pair of axially spaced discs slidably mounted on said shaft, annular braking surfaces on opposite sides of each disc, braking means for engagement with said annular braking surfaces, axially spaced radial surfaces in said housing, axially separable pressure plates located between the discs for bringing the discs into frictional engagement with the radial surfaces in the housing, co-operating inclined recesses in adjacent faces of said pressure plates, balls or rollers located in the recesses for urging apart the pressure plates on relative angular movement between the pressure plates, radially projecting ears on the pressure plates, recesses in said ears, angularly spaced pilot lugs projecting radially inwards from the housing and adapted to co-operate with portions of the outer peripheries of the plates to locate them centrally with respect to the housing, a cam for effective relative angular movement between said plates, a cam shaft on which the cam is mounted, means permitting a limited floating movement of the cam shaft in a circumferential direction when the brake is applied, lobes on said cam, recesses in said lobes complementary to the recesses in the ears on said pressure plates, thrust members for actuating the pressure plates, said thrust members having rounded ends in articulated engagement with the recesses in the ears on said pressure plates and in the lobes of said cam, an abutment stop for arresting angular movement of at least one of said plates defined at least in part by one of said angularly spaced pilot lugs, and a bolt passing through an opening in the housing and screwed through said one pilot lug for adjusting the angular position of said abutment stop, said bolt at its outer end projecting from the housing and externally accessible for adjustment, and at its inner end engageable with a radial lug on said one pressure plate for arresting angular movement of said pressure plate.

8. A disc brake comprising a stationary housing, a rotatable shaft within said housing, a pair of axially spaced discs slidably mounted on said shaft, annular braking surfaces on opposite sides of each disc, braking means for engagement with said annular braking surfaces, axially spaced radial surfaces in said housing, axially separable pressure plates located between the disc for bringing the discs innto frictional engagement with the radial surfaces in the housing, co-operating inclined recesses in adjacent faces of said pressure plates, balls or rollers located in the recesses for urging apart the pressure plates on relative angular movement between the pressure plates, radially projecting ears on the pressure plates, recesses in said ears, angularly spaced pilot lugs projecting radially inwards from the housing and adapted to co-operate with portions of the outer peripheries of the plates to locate them centrally with respect to the housing, a cam for effecting relative angular movement between said plates, a cam shaft on which the cam is mounted, means permitting a limited floating movement of the cam shaft in a circumferential direction when the brake is applied, lobes on said cam, recesses in said lobes complementary to the recesses in the ears on said pressure plates, thrust members for actuating the pressure plates, said thrust members having rounded ends in articulated engagement with recesses in the ears on said pressure plates and in the lobes of said cam, abutment stops for arresting angular movement of either of said plates according to the direction of rotation of the discs of which one abutment stop is defined at least in part by one of said pilot lugs and the other abutment stop is defined at least in part by another of said pilot lugs, and a pair of bolts passing through openings in the housing, one bolt being screwed through said one pilot lug for adjusting the angular position of said one abutment stop, and the other bolt being screwed through said another of said pilot lugs for adjusting the angular position of said other abutment stop, each bolt at its outer end projecting from the housing and externally accessible for adjustment, and at its inner end engageable with a radial lug on one of said pressure plates for arresting angular movement of that plate.

References Cited by the Examiner
UNITED STATES PATENTS

| | | | |
|---|---|---|---|
| 1,330,965 | 2/20 | White | 192—111 X |
| 1,603,963 | 10/26 | Liebowitz | 188—70 |
| 2,831,552 | 4/58 | Kershner | 188—72 |
| 2,854,097 | 9/58 | Lucker et al. | 188—72 |
| 2,874,807 | 2/59 | Hahn | 188—72 |
| 2,937,721 | 5/60 | Parrett | 188—72 |

MILTON BUCHLER, *Primary Examiner*.

EUGENE G. BOTZ, ARTHUR L. LA POINT,
*Examiners.*